(12) United States Patent
Dehlsen

(10) Patent No.: US 6,923,622 B1
(45) Date of Patent: Aug. 2, 2005

(54) MECHANISM FOR EXTENDABLE ROTOR BLADES FOR POWER GENERATING WIND AND OCEAN CURRENT TURBINES AND MEANS FOR COUNTER-BALANCING THE EXTENDABLE ROTOR BLADE

(75) Inventor: James G. P. Dehlsen, Montecito, CA (US)

(73) Assignee: Clipper Windpower Technology, Inc., Carpenteria, CA (US)

( * ) Notice: Subject to any disclaimer, the term of this patent is extended or adjusted under 35 U.S.C. 154(b) by 94 days.

(21) Appl. No.: 10/342,910

(22) Filed: Jan. 15, 2003

Related U.S. Application Data (60) Provisional application No. 60/362,139, filed on Mar. 7, 2002.

(51) Int. Cl.[7] .................................... F01D 7/00
(52) U.S. Cl. .................... 416/87; 416/89; 416/101
(58) Field of Search ................. 416/87, 88, 89, 416/101

(56) References Cited

U.S. PATENT DOCUMENTS

| | | | |
|---|---|---|---|
| 1,922,866 A | * | 8/1933 | Rosenberg et al. ........... 416/88 |
| 2,108,245 A | | 2/1938 | Ash, Jr. |
| 2,163,482 A | | 6/1939 | Cameron |
| 2,979,288 A | | 4/1961 | Klein |
| 3,249,160 A | | 5/1966 | Messerschmitt |
| 3,606,571 A | | 9/1971 | Wood |
| 3,814,351 A | | 6/1974 | Bielawa |
| 4,074,952 A | | 2/1978 | Fradenburgh et al. |
| 4,080,097 A | | 3/1978 | Hager et al. |
| 4,139,330 A | | 2/1979 | Neal |
| 4,180,372 A | | 12/1979 | Lippert, Jr. |
| 4,710,101 A | | 12/1987 | Jamieson |
| 5,253,979 A | | 10/1993 | Fradenburgh et al. |
| 5,299,912 A | | 4/1994 | Fradenburgh et al. |
| 5,310,314 A | | 5/1994 | Bastedo et al. |
| 5,620,303 A | | 4/1997 | Moffitt et al. |
| 5,620,304 A | | 4/1997 | Matsuka et al. |
| 5,630,705 A | | 5/1997 | Eikelenboom |
| 5,636,969 A | | 6/1997 | Matuska et al. |
| 5,642,982 A | | 7/1997 | Matuska et al. |
| 5,655,879 A | | 8/1997 | Kiely et al. |
| 5,735,670 A | | 4/1998 | Moffitt et al. |
| 6,019,578 A | | 2/2000 | Hager et al. |
| 6,030,177 A | | 2/2000 | Hager |
| 6,398,497 B1 | | 6/2002 | Federici et al. |

FOREIGN PATENT DOCUMENTS

DE       4428731 A1 *  2/1996   ............ F03D 1/06

* cited by examiner

*Primary Examiner*—Edward K. Look
*Assistant Examiner*—Dwayne J. White
(74) *Attorney, Agent, or Firm*—Owen L. Lamb (57) ABSTRACT

A power generating system wherein a turbine is mounted on top of a tower or tethered underwater. The turbine includes a rotor having a main blade section connected to a rotor hub and an extender section. An adjusting device positions the extender section between a retracted position within the main blade section and to an extended position to expose more or less of the rotor to the fluid flow. The adjusting device includes a first web-engaging wheel anchored at a hub end of the main blade section and a second web-engaging wheel anchored at a distal end of the main blade section. A web is wound around the first and second web-engaging wheels. The extender section is attached to the web at a hub end of the extender section. A generator is connected to the turbine for generating electrical energy.

24 Claims, 6 Drawing Sheets

MECHANISM FOR EXTENDABLE ROTOR BLADES FOR POWER GENERATING WIND AND OCEAN CURRENT TURBINES AND MEANS FOR COUNTER-BALANCING THE EXTENDABLE ROTOR BLADE

CROSS-REFERENCE TO RELATED APPLICATIONS

This application is a continuation in part of U.S. Provisional Patent Application No. 60/362,139, filed Mar. 7, 2002, and is related to commonly assigned copending application Ser. No. 10/039,825, (U.S. Pat. No. 6,726,439 B2) of Amir S. Mikhail and Geoffrey F. Deane filed Oct. 25, 2001 and granted Apr. 27, 2004, entitled "Extendable Rotor Blades For Power Generating Wind And Ocean Current Turbines And Means For Operating Below Set Rotor Torque Limits", both of which applications are incorporated herein by reference.

BACKGROUND OF THE INVENTION

1. Field of the Invention

This invention relates to electric power-generating devices, such as wind turbines and ocean current turbines, and more particularly to an apparatus for extending and retracting extendable rotors of horizontal axis, axial flow wind or water turbines.

2. Description of the Prior Art

U.S. Pat. No. 3,606,571 of Wood entitled "Stowed Rotor" granted Sep. 20, 1971, describes a stowed rotor mounted atop the fuselage of an airplane. The rotor includes a rotatable housing unit mounted on a vertical shaft and provided with a pair of rotor blade units that telescope into the housing unit. A mechanism is provided to extend and retract the rotor blade units from the housing unit, for the purpose of providing vertical lift during takeoff and vertical landing. The rotor blades are mechanically coupled together so that operation of one rotor blade is necessarily accompanied by duplicate and identical operation of the other rotor blade unit to thereby avoid unbalanced application of lifting and inertia forces. For opposing the reaction of the rotor blade assembly (yaw), a propeller is provided on the tail of the aircraft as in conventional helicopters.

In order to minimize friction between the rotor blade elements and the interior of the housing unit, a plurality of rollers are provided. For the purpose of providing internal structural support for the rotor blade elements, a plurality of rib stiffeners are provided to afford a stiffening action for the rotor blade elements similar to conventional aircraft wing structures.

Since a balanced lifting force must be provided under all operating conditions of the stowed rotor arrangement, a coupling system (FIG. 9) is provided which comprises a rigid arm affixed to one rotor blade and a similar arm which is affixed to the opposing rotor blade element. These transversely disposed arms are affixed at their inner ends to an endless device, which is rotatably mounted on two sprockets located on opposite distal ends of the housing unit. Thus, inward movement toward the right of one rotor blade necessarily imparts inward movement toward the left of the opposite rotor blade so that irrespective of the direction or magnitude of movement of either blade, both rotor blades necessarily are required to move in unison. One of the sprockets incorporates a reversible electric motor, which is energized and controlled by an undisclosed control means.

An aircraft may take off vertically or may be landed vertically by extending the rotor blades after imparting operating movement to the housing and rotor blades about a shaft. Rotary motion is imparted to the shaft by motive means not shown. After takeoff, when sufficient altitude is obtained, a conventional power system, such as forward thrust engines, may be employed.

The Wood patent is concerned with a stowed rotor arrangement for producing vertical lift for an aeronautical vehicle. The housing unit is mounted on the vehicle and rotatable about an axis, which is in general alignment with the direction of lift, using a pair of rotor blades telescopically mounted in the housing unit and disposed in generally transverse relation to the axis of rotation of the housing unit.

Wind and water current applications are not concerned with producing vertical lift for an aeronautical vehicle. On the contrary, in wind and current systems the rotors are mounted on a stationary structure and are rotatable about an axis, which is in general alignment with the direction of the wind or water current. In Wood, the housing unit is mounted on the vehicle and rotatable about an axis, which is in general alignment with the direction of lift, not in alignment with the wind or water current. In wind and water current applications the rotors are employed in a fundamentally different way to achieve a fundamentally different result. That is, the rotors are in alignment with the wind or water with the result that the rotors are moved by the current to produce electricity. In Wood, the rotors are in alignment with the direction of lift with the result that the rotors are moved by an engine to produce vertical lift. Wood describes a mechanism for a variable diameter rotor for aerospace applications wherein the rotor is driven by an engine and moves perpendicularly with respect to the flowing medium. Wood does not address the requirements of a wind or ocean current application, wherein the rotors are in alignment with and are driven by a flowing medium and do not move with respect to the flowing medium.

U.S. Pat. No. 3,814,351 of Bielawa entitled "Coaxial Rotor Yaw Control" granted Jun. 4, 1974, discloses coaxial counter-rotating rotors having telescoping blade tip portions which are normally partially extended. The blades of the upper and lower rotors can be differentially extended and retracted to create a resultant net torque between the rotors. The purpose is to provide yaw control by providing telescoping blade tip portions, which are differentially operated by a pilot-operated cable system that extends the tip portions of one rotor while retracting the tip portions of the other rotor.

Each blade is comprised of a hollow spar, which forms the leading edge and is the main strength member of the blade and a tapered trailing edge portion, which completes the airfoil contour of the blade. Each blade has a tip portion of reduced chord which has one end inserted into a cavity in the outboard end of the blade spar in which it is freely slidable. The tip portion is supported by two rollers on the spar, mounted at spaced points along its leading edge on pivots and by rollers mounted on pivots carried by the spar in position to engage the top and bottom tapered surfaces of the tip portion adjacent its trailing edge.

The extension and retraction of each tip portion of the upper rotor is controlled by a cable or flexible strap which is attached to the inboard end of the tip portion and passes through the hollow spar to a pulley mounted in the rotor hub by which the cable is directed downward through the hollow drive shaft. Inside the drive shaft three cables from three blades of the upper rotor are combined into a single cable. The tip portions of the lower rotor are similarly controlled by cables.

To obtain yaw control a rudder pedal is depressed which extends one of cables, and retracts the other, causing cable spools to rotate in opposite directions, one to wind up the cable(s) on one cable reel and the other to slacken its cable(s). The cables are held taut at all times by the rotating tip portions which are constantly urged outward regardless of their axial position by centrifugal forces generated by the rotating blades which are driven by the helicopter's engine.

The Bielawa patent does not address problems that arise with respect to an extendable rotor blade system that is fixed with respect to the flowing medium, whether the medium is air or water or any other fluid-flow medium.

The above prior art references describe mechanisms for aerospace applications wherein the rotor is driven by an engine and moves with respect to the flowing medium. These references do not address the requirements of a wind or ocean current applications, wherein the rotor is driven by a flowing medium and does not move with respect to the flowing medium and where durability and fatigue resistance are paramount to the success of such system, and wherein forces acting upon the rotor vary significantly during each revolution.

The mechanisms suggested in the prior art for controlling variable diameter rotors for tilt rotors and aircraft are susceptible to fatigue failures and require extensive maintenance. Wind turbines and ocean current turbines operate in environmental conditions that can quickly degrade the properties of an extension mechanism. The high maintenance requirement translates to higher energy cost, which results in a less competitive renewable energy system.

U.S. Pat. No. 4,180,372 of Lippert, Jr. entitled "Wind Rotor Automatic Air Brake" granted Dec. 25, 1979 discloses a spring-loaded pivoting end plate braking mechanism for a wind rotor. The end plate is hinged such that it is deployed by centrifugal force or a speed change detected by a sensor which controls an actuator to effect the required positioning of the brake plate into the air stream. The brake plate acts as an aerodynamic brake for wind turbines in over-speed conditions. The brake has a stationary portion fixed on the tip of the turbine rotor and a pivoting portion hinged for movement with respect to the fixed portion.

This patent teaches an aerodynamic windmill over-speed limiter which is located at the blade tip with its hinge axis transverse to the rotor blade chord such that the device has maximum effectiveness when deployed for braking and which, in its stowed position, acts to improve the aerodynamics of the rotor blade itself.

Because the brake is located at the rotor blade tip, the drag produced by the brake is at the greatest possible rotor radius such that a maximum torque braking effect is achieved. Also, when the brake plate is deployed, the trailing edge aft of the hinge line is rotated inwardly such that it is interposed over the tip area of the rotor blade. The brake, therefore, not only produces a drag at the maximum possible moment arm but, at the same time, it destroys efficient airflow over a portion of the blade that is normally very effective in driving the rotor.

It is desirable to produce the opposite effect: increasing the length of the rotor blade to improve efficient airflow over the outer extremity of the blade to increase its effectiveness in driving the rotor without introducing drag or braking.

U.S. Pat. No. 4,710,101 to Jamieson entitled "Wind Turbine" granted Dec. 1, 1987, discloses a wind turbine in which movable nose portions are located at or adjacent the leading edge of the blade and at or adjacent the tip of the blade. The nose portions are displaceable longitudinally of the blade, i.e. radially outwardly of the blade, from a normal retracted position. This moveable portion contributes to the lift of the airfoil section, and is moved to an advanced position in which drag is produced, to prevent unwanted increase in the speed of the rotation of the rotor.

The movable portion when in the normal, retracted position, will have little harmful effect on the aerodynamic shape of the airfoil section, the flow lines of the air passing from the movable portion extremely smoothly onto the remainder of the airfoil section.

The leading face of the remainder of the airfoil section has a flat or concave surface to increase the drag effect when the movable portion is in the advanced position. Further to increase the drag effect, bleed passages may lead from the leading faces of the remainder of the airfoil sections, which are exposed when the movable portions are moved to the advanced position. This bleed passages can extend to a major surface of the remainder of the respective airfoil section, to cause air to flow from the leading face to said major surface to cause separation of flow and increase drag. The portion exposed may in fact include part of the operating mechanism of the movable portion, which would even further increase the drag effect.

When the speed of rotation of the rotor reaches a value, which is the maximum value, which can be tolerated, the nose portions move radially outwardly. The nose portions move either under the action of centrifugal force against the return force of springs, or together with assistance from actuators, and the leading faces are exposed. The outward movement of the nose portions will itself cause an effective reshaping of the cross-section of the blades so they do not resemble an airfoil section at all, at the tip of the blade. This destroys lift on a section of the blade where the most power is produced. It will create much more drag on the exposed section, that is the leading face, which may be contoured or roughened to produce maximum drag. The displaced nose sections create drag at a radius beyond the normal position of the tip, where the velocity is higher and the effectiveness is greater.

The present invention is concerned with the opposite effect: increasing the length of the rotor blade to improve efficient airflow over the outer extremity of the blade to increase its effectiveness in driving the rotor without introducing drag or braking.

U.S. Pat. No. 5,630,705 of Eikelenboom entitled "Rotor Construction for Windmill" granted May 20, 1997 discloses a device for converting wind flow energy into mechanical energy. The device has a base construction and a rotor with a horizontal axis mounted on the base. The rotor has a number of elongated rotor blades, which are connected to a rotary support and extend radially therefrom. Each rotor blade or a part thereof is connected to the rotor support by a hinge connection for tilting the longitudinal axis of the rotor blade or part thereof to a predetermined orientation relative to the axis of rotation of the support. A hinge axis of the hinge connection between the rotor blade and the rotary support is directed at an acute angle both to the longitudinal axis of the rotor blade and to the axis of rotation of the support.

The maximum wind-braking area, to be used at relatively low wind speeds, is achieved when the rotor blades are at right angles to the wind direction, while pivoting the rotor blades away in the wind direction and pivoting the rotor blades around their longitudinal axes results in a lower wind-braking area to be used a relatively high wind speeds.

In order to increase the adjustability of the wind-breaking area to the actual wind speed, the rotor blades are formed by a number of elongated rotor blade parts, which are adapted to be placed in a position fully or partially overlapping each other in the lengthwise direction, or essentially in line with each other. For a minimum length of such a rotor blade, the component parts of the rotor blade fully overlap each other. A maximum length of such a rotor blade is achieved if all component rotor blade parts are placed in line with each other.

FIG. 5 of Eikelenboom illustrates an elongated, hollow first rotor blade part that is hingedly connected to an arm. The first rotor blade part contains an elongated, hollow second rotor blade part. The second rotor blade part can in turn contain an elongated third rotor blade part. The rotor blade parts can be shifted relative to each other in the lengthwise direction by separate mechanisms including a motor drive, a spindle and a wire cable for each moveable part fitted in the first rotor blade part. The wire is wound on the spindle. The wires can be subjected to both tensile stress and pressure, and a separate wire, spindle, motor arrangement is connected is to the first and second rotor blade parts, respectively, for the purpose of shifting the rotor blade parts in and out relative to each other.

A disadvantage of the device shown FIG. 5 of Eikelenboom is that the first rotor blade into which the second blade part slide must be completely hollow in order to accommodate the shape of the second blade. In modern large-scale turbine the blades are of such a size that reinforcing rib supports are necessary to obtain strength in large-scale wind and water current applications. The cable mechanism itself is not suitable for large scale turbines because the wires must be capable of being subjected to both tensile stress and pressure and such cables are not available for moving heavy objects.

As can be seen from the above descriptions, in the prior art it is known that the length of a blade can be adjusted such that the wind-braking area is varied. A disadvantage of the prior art devices is the number of component parts, which makes the devices complex to build, to service and to repair.

Commonly assigned U.S. Pat. No. 6,726,439 B2 of Amir S. Mikhail and Geoffrey F. Deane filed Oct. 25, 2001 and granted Apr. 27, 2004, entitled "Extendable Rotor Blades For Power Generating Wind And Ocean Current Turbines And Means For Operating Below Set Rotor Torque Limits", discloses a control for extendable rotor blades but does not describe in detail a mechanism for extending and retracting a rotor blade on a wind or water current driven turbine.

What is needed is a mechanism for wind or ocean current turbines which will facilitate extension and retraction of extendible rotor blades and which will be lightweight, easily maintainable, and durable.

SUMMARY OF THE INVENTION

The present invention relates to a fluid flow power generating system in which a turbine is mounted on a structure (such as a tall wind tower or a tethered underwater nacelle) that is held stationary in the horizontal axis with reference to the fluid flow. The turbine includes a rotor having a main blade section connected to a rotor hub and an extender section. An adjusting device is connected to the extender section such that the extender section is moveable between a retracted position relative to the main blade section and to a more extended position to expose more or less of the rotor to fluid flow. The adjusting device includes a web-engaging wheel actuation mechanism. A generator is connected to the turbine for generating electrical energy.

BRIEF DESCRIPTION OF THE DRAWINGS

The invention will be described in detail with reference to the drawings in which:

FIG. 3a is a more detailed view of the outer sprocket wheel shown in FIG. 2a;

FIG. 3b is a more detailed view of the inner sprocket wheel shown in FIG. 2b; and, FIG. 4 is a cross-sectional view than along the view lines 4—4 of FIG. 3a and illustrates a detailed view of the outer sprocket and tow pin of the web-engaging wheel actuation mechanism shown in FIG. 3a.

In these figures, similar numerals refer to similar elements in the drawings. It should be understood that the sizes of the different components in the figures may not be to scale, or in exact proportion, and are shown for visual clarity and for the purpose of explanation.

DESCRIPTION OF THE PREFERRED EMBODIMENTS

Figure 1A:
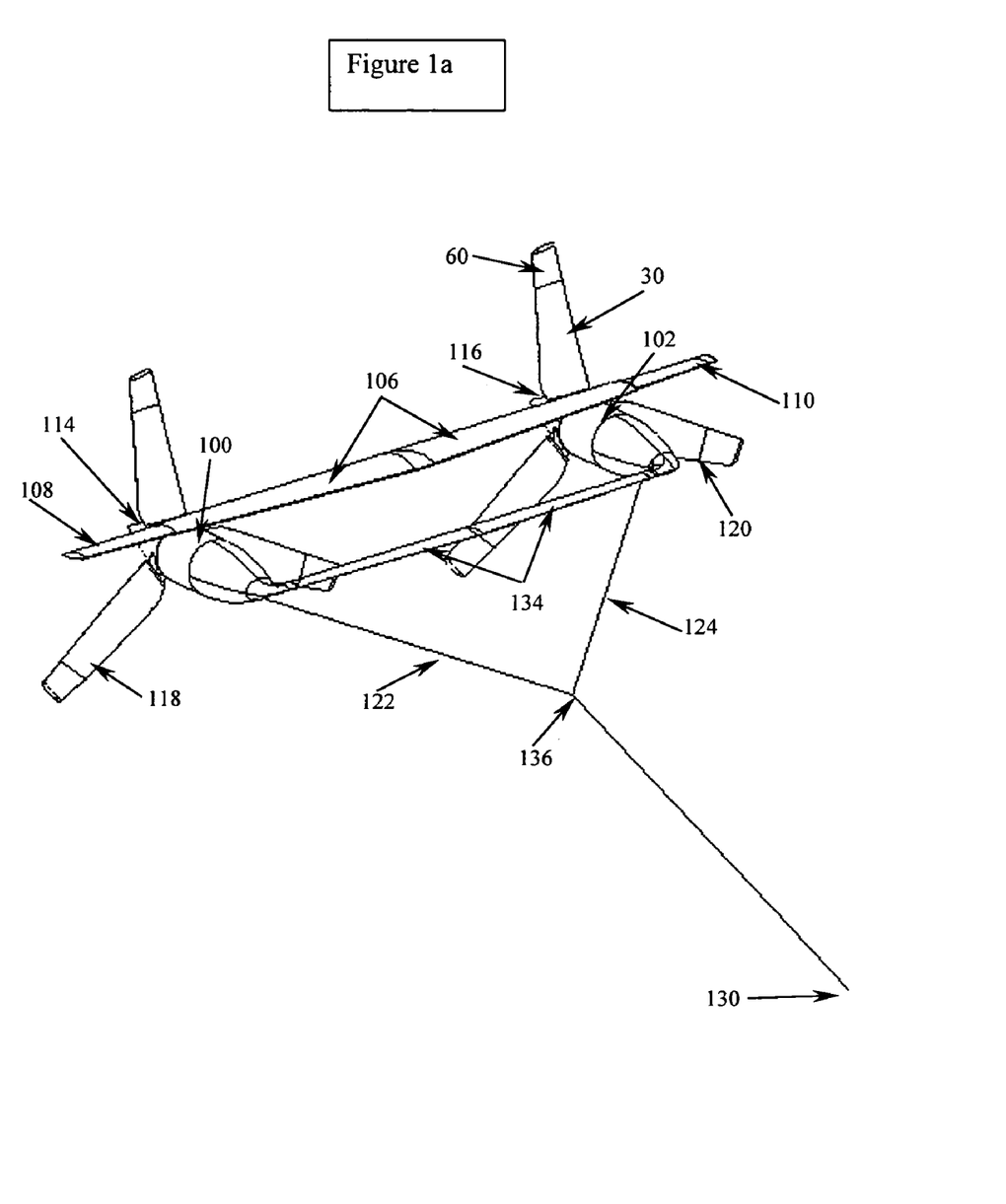
FIG. 1a illustrates an underwater power-generating device in which the invention is embodied.

FIG. 1a illustrates an underwater power-generating device. The underwater power-generating device includes a pair of electric generators housed in fluid-tight nacelles, 100, 102, which are connected together by a hydrofoil structure. The hydrofoil structure consists of a central section 106 and a pair of wings outboard of the nacelles ("wing tips") 108 and 110. The hydrofoil wing tips are canted upward to provide roll stability.

The central wing 106 contains one or more cylindrical ballast tanks that span the distance between nacelles. The ballast tanks are used to provide variable buoyancy and forward-aft weight shifting between ballast tanks and to serve as the structural members connecting the nacelles. The hydrofoil structure positions and supports the nacelles, 100, 102, on the upper surface of the wing 106 with each of the nacelles located at the ends of the central hydrofoil structure.

Each generator has a rotor 114 and 116 with variable pitch blades, 118 and 120, respectively, which rotate in opposite directions so that the torque forces on the structure balance. Each of the blades, 118, 120, has a blade base section 30 and a blade extension section 60 and is variable in length to provide a variable diameter rotor. The rotor diameter is controlled to fully extend the rotor at low flow velocity and to retract the rotor as flow velocity increases such that the loads delivered by or exerted upon the rotor do not exceed set limits. A pair of Y-tethers, 122, 124, tethers the power-generating device underwater in the path of the water current, such that the power-generating device is held in place horizontally in alignment with the ocean current. The rotors 114 and 116 are positioned relative to the hydrofoil 106 such that water current first moves past the wing 106, then engages, and causes rotation of the rotors 114 and 116. The tethers extend from the nose of each nacelle 100 and 102, to the Y-joint 136. Then from there to the anchoring member, 130 located on the ocean floor.

A pitch-adjusting stabilizer 134 is connected to each nacelle 100, 102. The pitch-adjusting stabilizer is positioned to extend upstream in a direction from the wing 106 so that the water current passes over the pitch-adjusting stabilizer first before encountering the wing.

The electric generators in the nacelles, 100, 102 are connected to power carrying cables inter-connecting to other units and/or to a shore-based power grid.

Figure 1B:
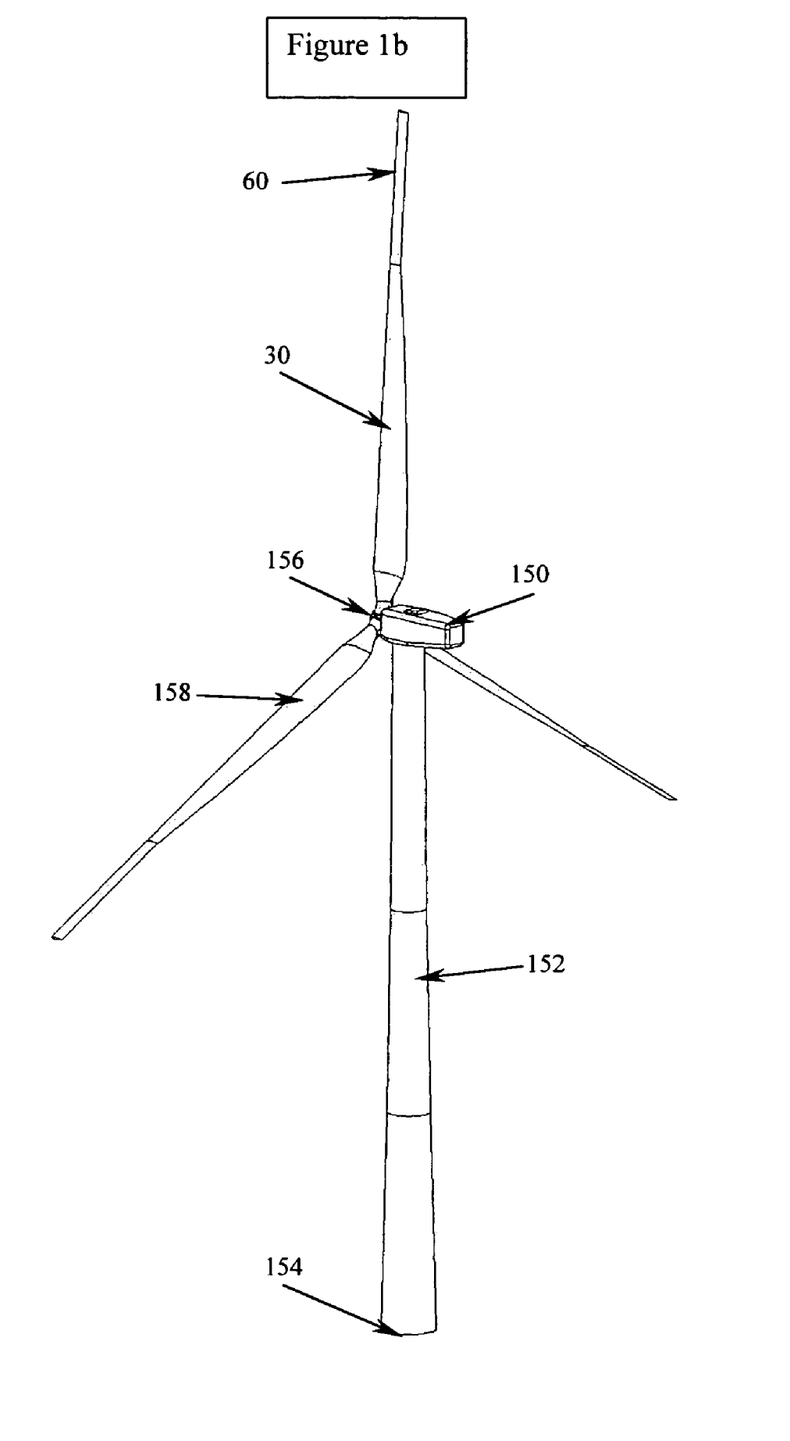
FIG. 1b illustrates a wind power-generating device in which the invention is embodied.

FIG. 1b illustrates a wind power-generating device. The wind power-generating device includes an electric generator housed in a turbine 150, which is mounted atop a tall tower structure 152 anchored 154 to the ground. The turbine 150 is free to rotate in the horizontal plane such that it tends to remain in the path of prevailing wind current. The turbine has a rotor 156 with variable pitch blades, 158, which rotate in response to wind current. Each of the blades has a blade base section 30 and a blade extension section 60 and is variable in length to provide a variable diameter rotor. The rotor diameter is controlled to fully extend the rotor at low flow velocity and to retract the rotor as flow velocity increases such that the loads delivered by or exerted upon the rotor do not exceed set limits. The power-generating device is held by the tower structure in the path of the wind current such that the power-generating device is held in place horizontally in alignment with the wind current. The electric generator is driven by the turbine to produce electricity and is connected to power carrying cables interconnecting to other units and/or to a power grid.

Power capture from wind and ocean current turbines is directly proportional to the cross-sectional area swept by the turbine's rotor blades, Conventional rotors utilize blades of fixed length, joined at a rotating hub. These blades may be of variable pitch (selectively rotatable about their longitudinal axes) in order to alter the angle of attack relative to the incoming fluid flow, principally for power shedding in high flow velocities. Alternatively, these blades may be fixed pitch or stall-regulated, wherein blade lift and therefore power capture falls off dramatically as wind speeds exceed some nominal value. Both variable pitch and stall regulated rotor blades with fixed diameters are well known in the art. The above-identified U.S. Pat. No. 6,726,439 B2 describes a wind or water flow energy converter comprising a wind or water flow actuated rotor assembly. The rotor comprises a plurality of blades, wherein the blades are variable in length to provide a variable diameter rotor. The rotor diameter is controlled to fully extend the rotor at low flow velocity and to retract the rotor as flow velocities increases such that the loads delivered by or exerted upon the rotor do not exceed set limits.

Figure 2A:
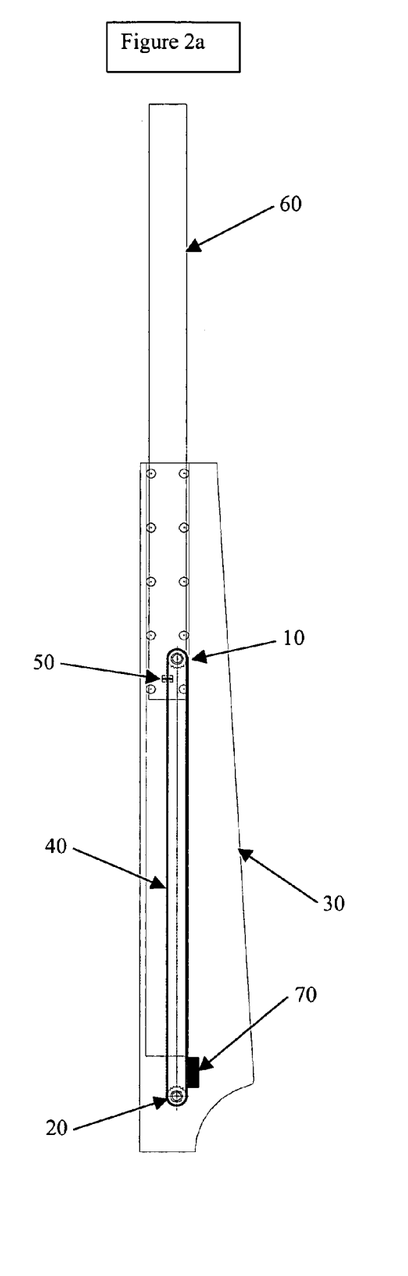
FIG. 2a illustrates a cut-away view of the present invention with the rotor fully extended.

FIG. 2a shows a schematic of the present invention. A rotor has a blade base section 30 and a blade extension section 60. An inner web-engaging wheel 20 is anchored at the hub end of the base section 30 and an outer web-engaging wheel 10 is anchored at the distal end of the base section, both wheels being mounted to the interior cavity of the extendable rotor-blade base section 30. The inner web-engaging wheel can alternatively be attached to the rotor hub (not shown). A web 40 spans and is wound around the inner and outer web-engaging wheels. A tow pin 50 is connected on one end to the web, and is connected on the other end to the rotor blade extension section 60. In FIG. 2a, the tow pin 50 is located near the outer web-engaging wheel 10 and secures the web 40 to the blade extension section 60, enabling the rotor blade extension section 60 to be extended or retracted as the web moves. A counterbalance weight 70 is attached to the web. The centrifugal force generated by the weight will partially counter-balance the centrifugal force required to retract the extender section.

Figure 2B:
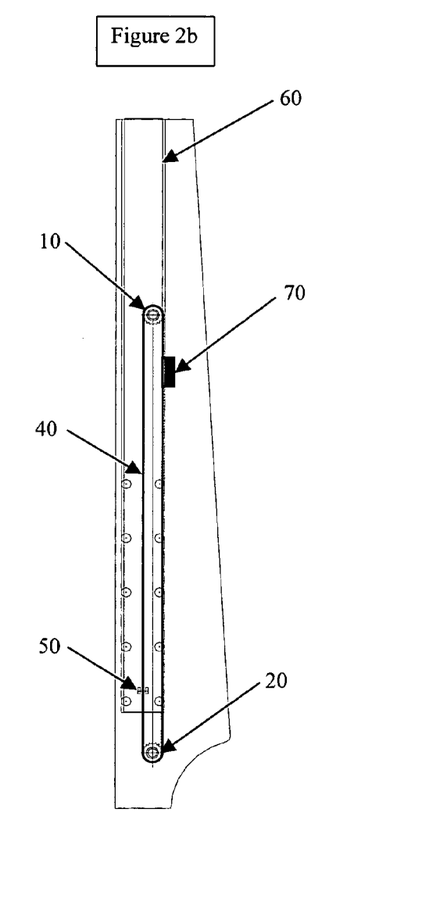
FIG. 2b illustrates a cut-away view of the web-engaging wheel actuation mechanism of the present invention with the rotor fully retracted.

In FIG. 2b the inner web-engaging wheel 20 has been forcibly driven counter clockwise by an actuator motor, some other device or actuating means (not shown) in order to move the web 40 around the periphery of the two web-engaging wheels 10, 20. As the web moves between the web-engaging wheels, the connected tow pin 50 is moved inwards toward the rotor hub, retracting the rotor blade extension section 60 to which the tow pin 60 is attached. The actuator motor may rotate the inner web-engaging wheel 20 clockwise in order to extend the blade extension section 60. In this configuration, the extender centrifugal force helps to extend the blade extender distally, while the weight moves toward the rotor hub to thereby average out the centrifugal force imposed on the actuator motor.

Figure 3A:
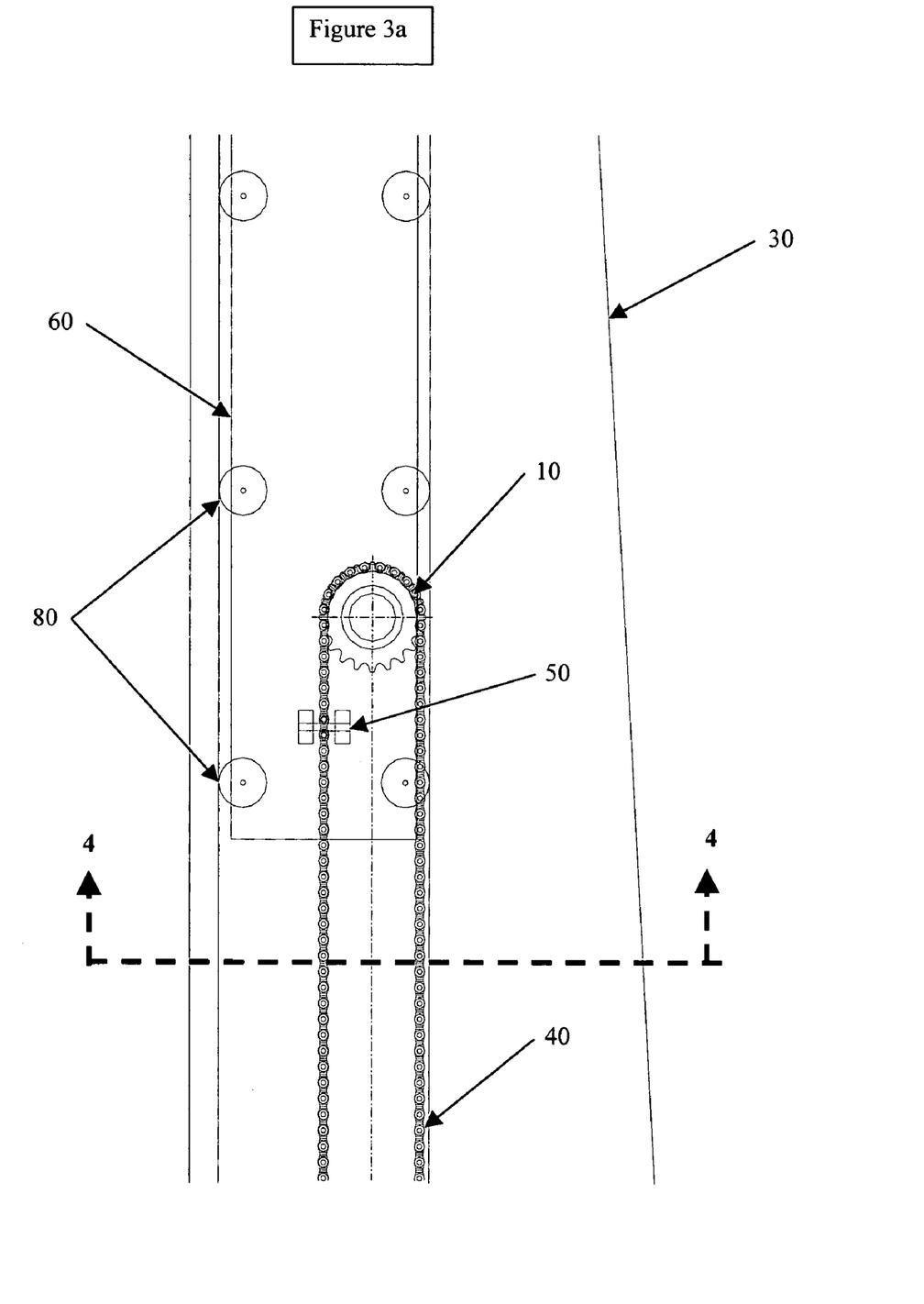

FIG. 3a shows a detailed view of the outer web-engaging wheel 10, web 40, tow pin 50, rotor blade base section 30, and rotor blade extension section 60 shown in FIG. 2a. Bearings 80 are mounted on the inner portion of the blade extension section 60 such that as the tow pin 50 is moved inwards and outwards by the web 40, the blade extension section 60 is able to slide inwards and outwards with minimal friction. Alternatively, the bearings could be mounted to the spars of the blade base section.

Figure 3B:
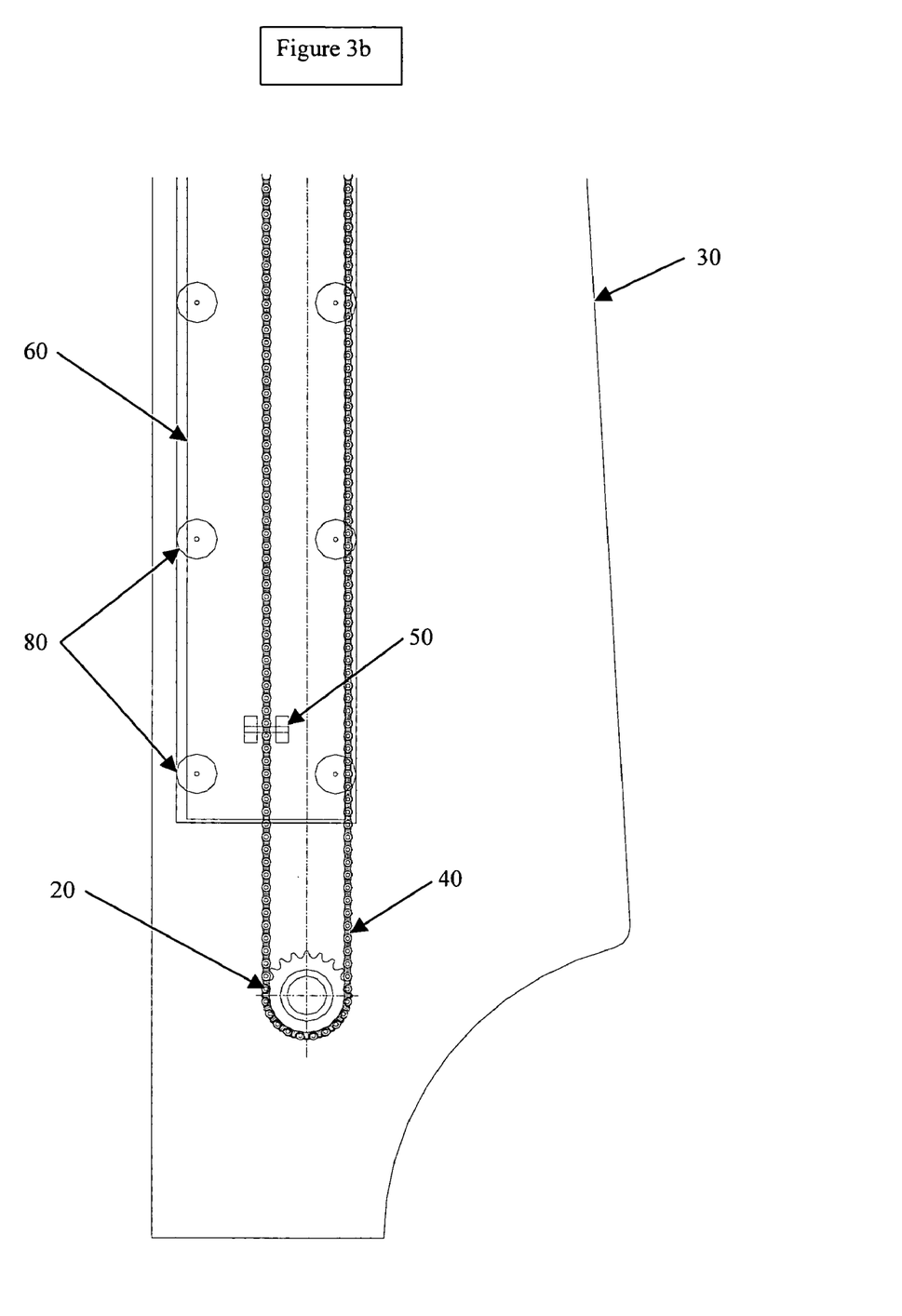

FIG. 3b shows a detailed view of the inner web-engaging wheel 20, web 40, tow pin 50, blade base section 30, blade extension section 60, and extension bearings 80. The motor drive for the mechanism (not shown) will ideally drive the inner web-engaging wheel 20. The inner web-engaging wheel may be mounted at the root of the blade base section 30 (as shown) or be mounted within the rotor hub (not shown) in order to improve accessibility for maintenance.

Figure 4:
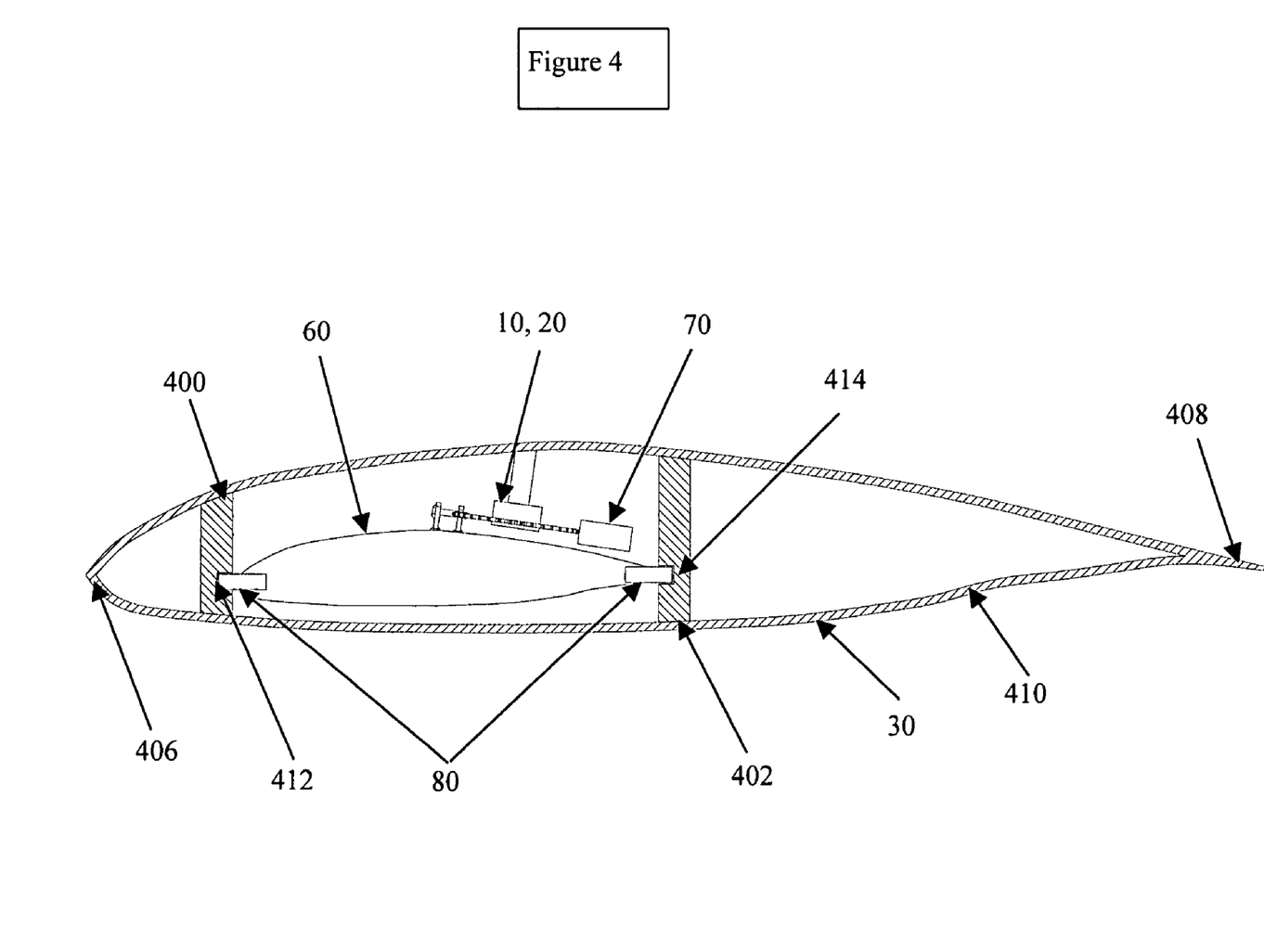

FIG. 4 shows a cross section view of the rotor blade taken along the view line 4—4 of FIG. 3a. Each root blade portion has spaced apart ribs defining the airfoil contour of the root blade and a lengthwise front spar 400 and rear spar 402 which are the main strength members of the root blade to which the ribs are attached. Each rib forms a leading edge 406 of the root blade and a tapered trailing edge 408, which completes the airfoil contour of the root blade. The ribs are covered with a fiberglass skin, 410.

The rotor blade extension section 60 is housed within the root blade base section 30. The rotor blade extension section 60 has spaced apart ribs defining the airfoil contour of the rotor blade extension and lengthwise front and rear spars which are the main strength members of the rotor blade extension. The bearings 80 allow the blade extension section 30 to roll within a space between the front and rear spars.

In the drawings, the mounting of the blade extension section 60 is illustrated to be mounted by bearings on the blade extension section 60 and guided by a front rail 412 built into the front spar 400 and a rear rail 414 built into the rear spar 402 of the blade base section 30. The web engaging wheels 10, 20 are driven horizontally. It is understood by those skilled in the art that the blade extension section 60 may be mounted by bearings contained on the blade base section 30 and/or driven vertically by the web engaging wheels.

In the drawings the web 40 is illustrated as a chain and the web-engaging wheels 10, 20 are illustrated as sprocket wheels. It will be understood by those skilled in the art that the web 40 may be a belt and the web-engaging wheels, 10, 20 may be friction wheels.

While the invention has been particularly shown and described with reference to preferred embodiments thereof, it will be understood by those skilled in the art that the foregoing and other changes in form and detail may be made therein without departing from the scope of the invention.

What is claimed is:

1. A fluid flow power generating system comprising:
a turbine mounted on a structure that is held stationary with reference to said fluid flow;
said turbine including a rotor having a main blade section connected to a rotor hub and an extender section, said turbine being positioned on said structure such that said rotor is in alignment with fluid flow direction;
said extender section being moveable between a position at least partially retracted in respect of said main blade section and an extended position relative to said main blade section;
an adjusting device connected to said extender section;
said adjusting device including a first web-engaging wheel anchored at a hub end of said main blade section;
a second web-engaging wheel anchored at a distal end of said main blade section; and
a web wound around said first and second web-engaging wheels;
said extender section being attached to said web at a hub end of said extender section;
a motor connected to at least one of said web-engaging wheels, actuable to selectively extend said extender section at low flow velocity and retract said extender section as flow velocity increases such that the loads delivered by or exerted upon said rotor do not exceed set limits; and,
a generator connected to said turbine for generating electrical energy.

2. The fluid flow power generating system of claim 1 wherein said extender section travels along grooves in said main blade section.

3. The rotor of claim 2 wherein said grooves in the main blade section are fitted with bearing rollers.

4. The rotor of claim 2 wherein said web is a chain and said web-engaging wheel is a sprocket wheel.

5. The rotor of claim 2 wherein said web is a belt and said web-engaging wheel is a friction wheel.

6. A fluid flow power generating system comprising:
a turbine mounted on a structure that is held stationary with reference to said fluid flow;
said turbine including a rotor having a main blade section connected to a rotor hub and an extender section, said turbine being positioned on said structure such that said rotor is in alignment with fluid flow direction;
said extender section being moveable between a position at least partially retracted in respect of said main blade section and an extended position relative to said main blade section;
an adjusting device connected to said extender section;
said adjusting device including a first web-engaging wheel anchored at a hub end of said main blade section;
a second web-engaging wheel anchored at a distal end of said main blade section;
a web wound around said first and second web-engaging wheels;
a counter-balancing weight attached to said web such that centrifugal force generated by said weight at least partially counter-balances centrifugal force required to retract said extender section;
said extender section being attached to said web at a hub end of said extender section; and,
a generator connected to said turbine for generating electrical energy.

7. The rotor of claim 6 wherein said web is a chain and said web-engaging wheel is a sprocket wheel.

8. The rotor of claim 6 wherein said web is a belt and one of said web-engaging wheels is a friction wheel.

9. In a fluid flow power-generating system, which includes a turbine, mounted on a structure that is held stationary with reference to said fluid flow;
said turbine including a rotor, said turbine being positioned on said structure such that said rotor is in alignment with fluid flow direction;
said rotor comprising:
a rotor hub;
a rotor blade having a main blade section connected to said rotor hub and an extender section;
a first sprocket wheel anchored at a hub end of said main blade section;
a second sprocket wheel anchored at a distal end of said main blade section;
a chain wound around and between said sprocket wheels;
said extender section being attached to said chain at a hub end of said extender section; and,
a motor connected to at least one of said sprocket wheels, actuable to selectively extend said extender section at low flow velocity and retract said extender section as flow velocity increases such that the loads delivered by or exerted upon said rotor do not exceed set limits.

10. The rotor of claim 9 wherein said extender section travels along grooves in said main blade section including bearing rollers within said grooves.

11. In a fluid flow power-generating system, which includes a turbine, mounted on a structure that is held stationary with reference to said fluid flow;
said turbine including a rotor, said turbine being positioned on said structure such that said rotor is in alignment with fluid flow direction;
said rotor comprising:
a rotor hub;
a rotor blade having a main blade section connected to said rotor hub and an extender section;
a first sprocket wheel anchored at a hub end of said main blade section;
a second sprocket wheel anchored at a distal end of said main blade section;
a chain wound around and between said sprocket wheels;
said extender section being attached to said chain at a hub end of said extender section;
an actuation mechanism connected to at least one of said sprocket wheels; and,
a counter-balancing weight attached to said chain positioned on said chain so as to reduce the peak centrifugal force requirement of said actuation mechanism.

12. In a fluid flow power-generating system, which includes a turbine, mounted on a structure that is held stationary with reference to said fluid flow;
said turbine including a rotor, said turbine being positioned on said structure such that said rotor is in alignment with fluid flow direction;
said rotor comprising:
a rotor hub;
a rotor blade having a main blade section connected to said rotor hub;
said main blade section having a hub end attached to said rotor hub and continuing from said hub end to a distal end of said main blade section;
said rotor blade including an extender section having a hub end;

said extender section being moveable between a position at least partially retracted in respect of said main blade section and an extended position relative to said main blade section;

a first sprocket wheel anchored at said hub end of said main blade section;

a second sprocket wheel anchored at said distal end of said main blade section;

a chain wound around and between said sprocket wheels;

said extender section being attached to said chain at said hub end of said extender section; and, a motor connected to at least one of said sprocket wheels, actuable to selectively extend said extender section at low flow velocity and retract said extender section as flow velocity increases such that the loads delivered by or exerted upon said rotor do not exceed set limits.

13. The rotor of claim 12 wherein said extender section travels along grooves in said main blade section including bearing rollers within said grooves.

14. In a fluid flow power-generating system, which includes a turbine, mounted on a structure that is held stationary with reference to said fluid flow;

said turbine including a rotor, said turbine being positioned on said structure such that said rotor is in alignment with fluid flow direction;

said rotor comprising:
a rotor hub;
a rotor blade having a main blade section connected to said rotor hub;
said main blade section having a hub end attached to said rotor hub and continuing from said hub end to a distal end of said main blade section;
said rotor blade including an extender section having a hub end;
said extender section being moveable between a position at least partially retracted in respect of said main blade section and an extended position relative to said main blade section;
a first sprocket wheel anchored at said hub end of said main blade section;
a second sprocket wheel anchored at said distal end of said main blade section;
a chain wound around and between said sprocket wheels;
said extender section being attached to said chain at said hub end of said extender section;
an actuation mechanism connected to at least one of said sprocket wheels; and,
a counter-balancing weight is attached to said chain to reduce the peak centrifugal force requirement of said actuation mechanism.

15. In a fluid flow power-generating system, which includes a turbine mounted on a structure that is held stationary with reference to said fluid flow;

said turbine including a rotor having a main blade section connected to a rotor hub and an extender section, said turbine being positioned on said structure such that said rotor is in alignment with fluid flow direction;

an apparatus comprising:
first anchoring means for anchoring a first web-engaging wheel at a hub end of said main blade section;
second anchoring means for anchoring a second web-engaging wheel at a distal end of said main blade section;
a web wound around said first web-engaging wheel and said second web-engaging wheel;
said web being attached at a hub end of said extender section; and,
a motor connected to at least one of said web-engaging wheels to selectively extend said extender section at low flow velocity and retract said extender section as flow velocity increases such that the loads delivered by or exerted upon said rotor do not exceed set limits.

16. The apparatus of claim 15 wherein said extender section travels along grooves in the main blade section utilizing bearing rollers.

17. The apparatus of claim 15 wherein said web is a chain and one of said web-engaging wheels is a sprocket wheel.

18. The apparatus of claim 15 wherein said web is a belt and one of said web-engaging wheels is a friction wheel.

19. In a fluid flow power-generating system, which includes a turbine mounted on a structure that is held stationary with reference to said fluid flow;

said turbine including a rotor having a main blade section connected to a rotor hub and an extender section, said turbine being positioned on said structure such that said rotor is in alignment with fluid flow direction;

an apparatus comprising:
first anchoring means for anchoring a first web-engaging wheel at a hub end of said main blade section;
second anchoring means for anchoring a second web-engaging wheel at a distal end of said main blade section;
a web wound around said first web-engaging wheel and said second web-engaging wheel;
said web being attached at a hub end of said extender section;
actuating means for actuating at least one of said web-engaging wheels to selectively extend and retract said extender section; and,
a counter-balancing weight attached to said web at such a location so as to reduce a peak centrifugal force requirement of said actuation means.

20. In a fluid flow power-generating system, which includes a turbine mounted on a structure that is held stationary with reference to said fluid flow;

said turbine including a rotor having a main blade section connected to a rotor hub and an extender section, said turbine being positioned on said structure such that said rotor is in alignment with fluid flow direction;

a method comprising steps of:
anchoring a first web-engaging wheel at a hub end of said main blade section;
anchoring a second web-engaging wheel at a distal end of said main blade section;
winding a web around said first web-engaging wheel and said second web-engaging wheel;
attaching said web at a hub end of said extender section; and,
actuating at least one of said web-engaging wheels to selectively extend said extender section at low flow velocity and retract said extender section as flow velocity increases such that the loads delivered by or exerted upon said rotor do not exceed set limits.

21. The method of claim 20 wherein said extender section travels along grooves in the main blade section utilizing bearing rollers.

22. The method of claim 20 wherein said web is a chain and one of said web-engaging wheels is a sprocket wheel.

23. The method of claim 20 wherein said web is a belt and one of said web-engaging wheels is a friction wheel.

24. In a fluid flow power-generating system, which includes a turbine mounted on a structure that is held stationary with reference to said fluid flow;

said turbine including a rotor having a main blade section connected to a rotor hub and an extender section, said turbine being positioned on said structure such that said rotor is in alignment with fluid flow direction;

a method comprising steps of:

anchoring a first web-engaging wheel at a hub end of said main blade section;

anchoring a second web-engaging wheel at a distal end of said main blade section;

winding a web around said first web-engaging wheel and said second web-engaging wheel;

attaching said web at a hub end of said extender section;

actuating at least one of said web-engaging wheels to selectively extend and retract said extender section; and, attaching a counter-balancing weight to said web at such a location so as to reduce a peak centrifugal force requirement of an actuation system.

* * * * *